(12) United States Patent
Brown et al.

(10) Patent No.: US 7,791,348 B2
(45) Date of Patent: Sep. 7, 2010

(54) BATTERY TESTER WITH PROMOTION FEATURE TO PROMOTE USE OF THE BATTERY TESTER BY PROVIDING THE USER WITH CODES HAVING REDEEMABLE VALUE

(75) Inventors: Dennis V. Brown, Plano, TX (US); Kevin I. Bertness, Batavia, IL (US); Stephen J. McShane, Oak Brook, IL (US); Michael E. Troy, Homer Glen, IL (US); William G. Sampson, Elmhurst, IL (US)

(73) Assignee: Midtronics, Inc., Willowbrook, IL (US)

( * ) Notice: Subject to any disclaimer, the term of this patent is extended or adjusted under 35 U.S.C. 154(b) by 312 days.

(21) Appl. No.: 11/711,356

(22) Filed: Feb. 27, 2007

(65) Prior Publication Data

US 2008/0204030 A1 Aug. 28, 2008

(51) Int. Cl.
*G01N 27/416* (2006.01)
*H02J 7/14* (2006.01)
*G06Q 30/00* (2006.01)

(52) U.S. Cl. ............... 324/426; 320/104; 705/14.1
(58) Field of Classification Search ........... 324/426; 705/14
See application file for complete search history.

(56) References Cited

U.S. PATENT DOCUMENTS

| | | | |
|---|---|---|---|
| 2,000,665 A | 5/1935 | Neal | 439/440 |
| 2,417,940 A | 3/1947 | Lehman | 200/61.25 |
| 2,514,745 A | 7/1950 | Dalzell | 324/115 |
| 2,727,221 A | 12/1955 | Springg | 340/447 |
| 3,178,686 A | 4/1965 | Mills | 340/447 |
| 3,223,969 A | 12/1965 | Alexander | 340/447 |
| 3,267,452 A | 8/1966 | Wolf | 340/249 |
| 3,356,936 A | 12/1967 | Smith | 324/429 |
| 3,562,634 A | 2/1971 | Latner | 324/427 |
| 3,593,099 A | 7/1971 | Scholl | 320/127 |
| 3,607,673 A | 9/1971 | Seyl | 324/425 |
| 3,652,341 A | 3/1972 | Halsall et al. | 29/623.2 |
| 3,676,770 A | 7/1972 | Sharaf et al. | 324/430 |
| 3,729,989 A | 5/1973 | Little | 73/862.192 |

(Continued)

FOREIGN PATENT DOCUMENTS

DE 29 26 716 B1 1/1981

(Continued)

OTHER PUBLICATIONS

"Electrochemical Impedance Spectroscopy in Battery Development and Testing", *Batteries International*, Apr. 1997, pp. 59 and 62-63.

(Continued)

*Primary Examiner*—Edward Tso
*Assistant Examiner*—Ahmed Omar
(74) *Attorney, Agent, or Firm*—Westman, Champlin & Kelly, P.A.

(57) ABSTRACT

Battery maintenance equipment is provided for use in maintaining storage batteries. The battery maintenance equipment includes battery maintenance circuitry. A redemption code output is provided and configured to provide an output having a redeemable value in response to the battery maintenance circuitry. A method includes outputting a redemption code in response to usage of battery maintenance equipment.

33 Claims, 5 Drawing Sheets

U.S. PATENT DOCUMENTS

| | | | |
|---|---|---|---|
| 3,750,011 A | 7/1973 | Kreps | 324/430 |
| 3,753,094 A | 8/1973 | Furuishi et al. | 324/430 |
| 3,796,124 A | 3/1974 | Crosa | 411/521 |
| 3,808,522 A | 4/1974 | Sharaf | 324/430 |
| 3,811,089 A | 5/1974 | Strezelewicz | 324/170 |
| 3,850,490 A | 11/1974 | Zehr | 439/822 |
| 3,873,911 A | 3/1975 | Champlin | 324/430 |
| 3,876,931 A | 4/1975 | Godshalk | 324/429 |
| 3,886,443 A | 5/1975 | Miyakawa et al. | 324/426 |
| 3,889,248 A | 6/1975 | Ritter | 340/636.11 |
| 3,906,329 A | 9/1975 | Bader | 320/134 |
| 3,909,708 A | 9/1975 | Champlin | 324/431 |
| 3,936,744 A | 2/1976 | Perlmutter | 324/772 |
| 3,946,299 A | 3/1976 | Christianson et al. | 320/430 |
| 3,947,757 A | 3/1976 | Grube et al. | 324/416 |
| 3,969,667 A | 7/1976 | McWilliams | 324/427 |
| 3,979,664 A | 9/1976 | Harris | 324/397 |
| 3,984,762 A | 10/1976 | Dowgiallo, Jr. | 324/430 |
| 3,984,768 A | 10/1976 | Staples | 324/712 |
| 3,989,544 A | 11/1976 | Santo | 429/65 |
| 4,008,619 A | 2/1977 | Alcaide et al. | 73/724 |
| 4,023,882 A | 5/1977 | Pettersson | 439/426 |
| 4,024,953 A | 5/1977 | Nailor, III | 206/344 |
| 4,047,091 A | 9/1977 | Hutchines et al. | 363/59 |
| 4,053,824 A | 10/1977 | Dupuis et al. | 324/434 |
| 4,056,764 A | 11/1977 | Endo et al. | 320/101 |
| 4,057,313 A | 11/1977 | Polizzano | 439/219 |
| 4,070,624 A | 1/1978 | Taylor | 324/772 |
| 4,086,531 A | 4/1978 | Bernier | 324/772 |
| 4,106,025 A | 8/1978 | Katz | 343/715 |
| 4,112,351 A | 9/1978 | Back et al. | 324/380 |
| 4,114,083 A | 9/1978 | Benham et al. | 340/636.13 |
| 4,126,874 A | 11/1978 | Suzuki et al. | 396/301 |
| 4,160,916 A | 7/1979 | Papasideris | 307/10.6 |
| 4,178,546 A | 12/1979 | Hulls et al. | 324/772 |
| 4,193,025 A | 3/1980 | Frailing et al. | 324/427 |
| 4,207,611 A | 6/1980 | Gordon | 701/33 |
| 4,217,645 A | 8/1980 | Barry et al. | 702/63 |
| 4,280,457 A | 7/1981 | Bloxham | 123/198 R |
| 4,297,639 A | 10/1981 | Branham | 324/429 |
| 4,307,342 A | 12/1981 | Peterson | 324/767 |
| 4,315,204 A | 2/1982 | Sievers et al. | 322/28 |
| 4,316,185 A | 2/1982 | Watrous et al. | 340/636.11 |
| 4,322,685 A | 3/1982 | Frailing et al. | 324/429 |
| 4,351,405 A | 9/1982 | Fields et al. | 180/65.2 |
| 4,352,067 A | 9/1982 | Ottone | 324/434 |
| 4,360,780 A | 11/1982 | Skutch, Jr. | 324/437 |
| 4,361,809 A | 11/1982 | Bil et al. | 324/426 |
| 4,363,407 A | 12/1982 | Buckler et al. | 209/3.3 |
| 4,369,407 A | 1/1983 | Korbell | 324/416 |
| 4,379,989 A | 4/1983 | Kurz et al. | 320/165 |
| 4,379,990 A | 4/1983 | Sievers et al. | 322/99 |
| 4,385,269 A | 5/1983 | Aspinwall et al. | 320/129 |
| 4,390,828 A | 6/1983 | Converse et al. | 320/153 |
| 4,392,101 A | 7/1983 | Saar et al. | 320/156 |
| 4,396,880 A | 8/1983 | Windebank | 320/156 |
| 4,408,157 A | 10/1983 | Beaubien | 324/712 |
| 4,412,169 A | 10/1983 | Dell'Orto | 320/123 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,459,548 A | 7/1984 | Lentz et al. | 324/472 |
| 4,514,694 A | 4/1985 | Finger | 324/429 |
| 4,520,353 A | 5/1985 | McAuliffe | 340/636.16 |
| 4,521,498 A | 6/1985 | Juergens | 429/59 |
| 4,564,798 A | 1/1986 | Young | 320/103 |
| 4,620,767 A | 11/1986 | Woolf | 439/217 |
| 4,633,418 A | 12/1986 | Bishop | 702/63 |
| 4,637,359 A | 1/1987 | Cook | 123/179 |
| 4,659,977 A | 4/1987 | Kissel et al. | 320/150 |
| 4,663,580 A | 5/1987 | Wortman | 320/153 |
| 4,665,370 A | 5/1987 | Holland | 324/429 |
| 4,667,143 A | 5/1987 | Cooper et al. | 320/153 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/165 |
| 4,686,442 A | 8/1987 | Radomski | 320/123 |
| 4,697,134 A | 9/1987 | Burkum et al. | 320/134 |
| 4,707,795 A | 11/1987 | Alber et al. | 702/63 |
| 4,709,202 A | 11/1987 | Koenck et al. | 320/112 |
| 4,710,861 A | 12/1987 | Kanner | 363/46 |
| 4,719,428 A | 1/1988 | Liebermann | 324/436 |
| 4,723,656 A | 2/1988 | Kiernan et al. | 206/705 |
| 4,743,855 A | 5/1988 | Randin et al. | 324/430 |
| 4,745,349 A | 5/1988 | Palanisamy et al. | 320/125 |
| 4,773,011 A | 9/1988 | VanHoose | 701/30 |
| 4,781,629 A | 11/1988 | Mize | 439/822 |
| 4,816,768 A | 3/1989 | Champlin | 324/428 |
| 4,820,966 A | 4/1989 | Fridman | 320/116 |
| 4,825,170 A | 4/1989 | Champlin | 324/436 |
| 4,847,547 A | 7/1989 | Eng, Jr. et al. | 320/153 |
| 4,849,700 A | 7/1989 | Morioka et al. | 324/427 |
| 4,874,679 A | 10/1989 | Miyagawa | 429/91 |
| 4,876,495 A | 10/1989 | Palanisamy et al. | 320/106 |
| 4,881,038 A | 11/1989 | Champlin | 324/426 |
| 4,888,716 A | 12/1989 | Ueno | 702/63 |
| 4,901,007 A | 2/1990 | Sworm | 324/110 |
| 4,907,176 A | 3/1990 | Bahnick et al. | 364/551.01 |
| 4,912,416 A | 3/1990 | Champlin | 324/430 |
| 4,913,116 A | 4/1990 | Katogi et al. | 123/406.32 |
| 4,926,330 A | 5/1990 | Abe et al. | 701/33 |
| 4,929,931 A | 5/1990 | McCuen | 340/636.15 |
| 4,931,738 A | 6/1990 | MacIntyre et al. | 324/435 |
| 4,932,905 A | 6/1990 | Richards | 439/822 |
| 4,933,845 A | 6/1990 | Hayes | 710/104 |
| 4,934,957 A | 6/1990 | Bellusci | 439/504 |
| 4,937,528 A | 6/1990 | Palanisamy | 324/430 |
| 4,947,124 A | 8/1990 | Hauser | 324/430 |
| 4,949,046 A | 8/1990 | Seyfang | 324/427 |
| 4,956,597 A | 9/1990 | Heavey et al. | 320/129 |
| 4,968,941 A | 11/1990 | Rogers | 324/428 |
| 4,968,942 A | 11/1990 | Palanisamy | 324/430 |
| 4,969,834 A | 11/1990 | Johnson | 439/141 |
| 4,983,086 A | 1/1991 | Hatrock | 411/259 |
| 5,004,979 A | 4/1991 | Marino et al. | 324/160 |
| 5,032,825 A | 7/1991 | Kuznicki | 340/636.15 |
| 5,034,893 A | 7/1991 | Fisher | 701/99 |
| 5,037,778 A | 8/1991 | Stark et al. | 228/121 |
| 5,047,722 A | 9/1991 | Wurst et al. | 324/430 |
| 5,081,565 A | 1/1992 | Nabha et al. | 362/465 |
| 5,087,881 A | 2/1992 | Peacock | 324/378 |
| 5,095,223 A | 3/1992 | Thomas | 307/110 |
| 5,108,320 A | 4/1992 | Kimber | 439/883 |
| 5,109,213 A | 4/1992 | Williams | 340/447 |
| 5,126,675 A | 6/1992 | Yang | 324/435 |
| 5,130,658 A | 7/1992 | Bohmer | 324/435 |
| 5,140,269 A | 8/1992 | Champlin | 324/433 |
| 5,144,218 A | 9/1992 | Bosscha | 320/139 |
| 5,144,248 A | 9/1992 | Alexandres et al. | 324/428 |
| 5,159,272 A | 10/1992 | Rao et al. | 324/429 |
| 5,160,881 A | 11/1992 | Schramm et al. | 322/7 |
| 5,168,208 A | 12/1992 | Schultz et al. | 322/25 |
| 5,170,124 A | 12/1992 | Blair et al. | 324/434 |
| 5,179,335 A | 1/1993 | Nor | 320/159 |
| 5,194,799 A | 3/1993 | Tomantschger | 320/103 |
| 5,204,611 A | 4/1993 | Nor et al. | 320/145 |
| 5,214,370 A | 5/1993 | Harm et al. | 320/152 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/125 |
| 5,281,919 A | 1/1994 | Palanisamy | 324/427 |
| 5,281,920 A | 1/1994 | Wurst | 324/430 |

| Patent No. | Kind | Date | Inventor | Class |
|---|---|---|---|---|
| 5,295,078 | A | 3/1994 | Stich et al. | 700/297 |
| 5,298,797 | A | 3/1994 | Redl | 327/387 |
| 5,300,874 | A | 4/1994 | Shimamoto et al. | 320/106 |
| 5,302,902 | A | 4/1994 | Groehl | 324/434 |
| 5,313,152 | A | 5/1994 | Wozniak et al. | 320/118 |
| 5,315,287 | A | 5/1994 | Sol | 340/455 |
| 5,321,626 | A | 6/1994 | Palladino | 702/63 |
| 5,321,627 | A | 6/1994 | Reher | 702/63 |
| 5,323,337 | A | 6/1994 | Wilson et al. | 702/73 |
| 5,325,041 | A | 6/1994 | Briggs | 320/149 |
| 5,331,268 | A | 7/1994 | Patino et al. | 320/158 |
| 5,336,993 | A | 8/1994 | Thomas et al. | 324/158.1 |
| 5,338,515 | A | 8/1994 | Dalla Betta et al. | 422/95 |
| 5,339,018 | A | 8/1994 | Brokaw | 320/147 |
| 5,343,380 | A | 8/1994 | Champlin | 363/46 |
| 5,347,163 | A | 9/1994 | Yoshimura | 307/66 |
| 5,352,968 | A | 10/1994 | Reni et al. | 320/136 |
| 5,357,519 | A | 10/1994 | Martin et al. | 371/15.1 |
| 5,365,160 | A | 11/1994 | Leppo et al. | 320/160 |
| 5,365,453 | A | 11/1994 | Startup et al. | 702/36 |
| 5,369,364 | A | 11/1994 | Renirie et al. | 324/430 |
| 5,381,096 | A | 1/1995 | Hirzel | 324/427 |
| 5,402,007 | A | 3/1995 | Center et al. | 290/40 B |
| 5,410,754 | A | 4/1995 | Klotzbach et al. | 370/466 |
| 5,412,308 | A | 5/1995 | Brown | 323/267 |
| 5,412,323 | A | 5/1995 | Kato et al. | 324/429 |
| 5,425,041 | A | 6/1995 | Seko et al. | 372/45.01 |
| 5,426,371 | A | 6/1995 | Salley et al. | 324/429 |
| 5,426,416 | A | 6/1995 | Jefferies et al. | 340/664 |
| 5,432,025 | A | 7/1995 | Cox | 29/65 |
| 5,432,426 | A | 7/1995 | Yoshida | 320/160 |
| 5,434,495 | A | 7/1995 | Toko | 320/135 |
| 5,435,185 | A | 7/1995 | Eagan | 73/587 |
| 5,442,274 | A | 8/1995 | Tamai | 320/146 |
| 5,445,026 | A | 8/1995 | Eagan | 73/591 |
| 5,449,996 | A | 9/1995 | Matsumoto et al. | 320/148 |
| 5,449,997 | A | 9/1995 | Gilmore et al. | 320/148 |
| 5,451,881 | A | 9/1995 | Finger | 324/433 |
| 5,453,027 | A | 9/1995 | Buell et al. | 439/433 |
| 5,457,377 | A | 10/1995 | Jonsson | 324/430 |
| 5,459,660 | A | 10/1995 | Berra | 701/33 |
| 5,469,043 | A | 11/1995 | Cherng et al. | 320/161 |
| 5,485,090 | A | 1/1996 | Stephens | 324/433 |
| 5,488,300 | A | 1/1996 | Jamieson | 324/432 |
| 5,504,674 | A | 4/1996 | Chen et al. | 705/4 |
| 5,508,599 | A | 4/1996 | Koenck | 320/138 |
| 5,519,383 | A | 5/1996 | De La Rosa | 340/636.15 |
| 5,528,148 | A | 6/1996 | Rogers | 320/137 |
| 5,537,967 | A | 7/1996 | Tashiro et al. | 123/192.1 |
| 5,541,489 | A | 7/1996 | Dunstan | 320/134 |
| 5,546,317 | A | 8/1996 | Andrieu | 702/63 |
| 5,548,273 | A | 8/1996 | Nicol et al. | 340/439 |
| 5,550,485 | A | 8/1996 | Falk | 324/772 |
| 5,561,380 | A | 10/1996 | Sway-Tin et al. | 324/509 |
| 5,562,501 | A | 10/1996 | Kinoshita et al. | 439/852 |
| 5,563,496 | A | 10/1996 | McClure | 320/128 |
| 5,572,136 | A | 11/1996 | Champlin | 324/426 |
| 5,573,611 | A | 11/1996 | Koch et al. | 152/152.1 |
| 5,574,355 | A | 11/1996 | McShane et al. | 320/161 |
| 5,578,915 | A | 11/1996 | Crouch, Jr. et al. | 324/428 |
| 5,583,416 | A | 12/1996 | Klang | 320/160 |
| 5,585,416 | A | 12/1996 | Audett et al. | 522/35 |
| 5,585,728 | A | 12/1996 | Champlin | 324/427 |
| 5,589,757 | A | 12/1996 | Klang | 320/160 |
| 5,592,093 | A | 1/1997 | Klingbiel | 324/426 |
| 5,592,094 | A | 1/1997 | Ichikawa | 324/427 |
| 5,596,260 | A | 1/1997 | Moravec et al. | 320/135 |
| 5,598,098 | A | 1/1997 | Champlin | 324/430 |
| 5,602,462 | A | 2/1997 | Stich et al. | 323/258 |
| 5,606,242 | A | 2/1997 | Hull et al. | 320/106 |
| 5,614,788 | A | 3/1997 | Mullins et al. | 315/82 |
| 5,621,298 | A | 4/1997 | Harvey | 320/134 |
| 5,633,985 | A | 5/1997 | Severson et al. | 704/267 |
| 5,637,978 | A | 6/1997 | Kellett et al. | 320/104 |
| 5,642,031 | A | 6/1997 | Brotto | 320/156 |
| 5,650,937 | A | 7/1997 | Bounaga | 702/65 |
| 5,652,501 | A | 7/1997 | McClure et al. | 340/636.15 |
| 5,653,659 | A | 8/1997 | Kunibe et al. | 477/111 |
| 5,654,623 | A | 8/1997 | Shiga et al. | 320/106 |
| 5,656,920 | A | 8/1997 | Cherng et al. | 324/431 |
| 5,661,368 | A | 8/1997 | Deol et al. | 315/82 |
| 5,675,234 | A | 10/1997 | Greene | 340/636.11 |
| 5,677,077 | A | 10/1997 | Faulk | 429/90 |
| 5,684,678 | A | 11/1997 | Barrett | 363/17 |
| 5,699,050 | A | 12/1997 | Kanazawa | 340/636.13 |
| 5,701,089 | A | 12/1997 | Perkins | 324/772 |
| 5,705,929 | A | 1/1998 | Caravello et al. | 324/430 |
| 5,707,015 | A | 1/1998 | Guthrie | 241/120 |
| 5,710,503 | A | 1/1998 | Sideris et al. | 320/116 |
| 5,711,648 | A | 1/1998 | Hammerslag | 414/800 |
| 5,717,336 | A | 2/1998 | Basell et al. | 324/430 |
| 5,717,937 | A | 2/1998 | Fritz | 713/300 |
| 5,739,667 | A | 4/1998 | Matsuda et al. | 320/128 |
| 5,744,962 | A | 4/1998 | Alber et al. | 324/426 |
| 5,745,044 | A | 4/1998 | Hyatt, Jr. et al. | 340/5.23 |
| 5,747,189 | A | 5/1998 | Perkins | 429/91 |
| 5,747,909 | A | 5/1998 | Syverson et al. | 310/156.56 |
| 5,747,967 | A | 5/1998 | Muljadi et al. | 320/148 |
| 5,754,417 | A | 5/1998 | Nicollini | 363/60 |
| 5,757,192 | A | 5/1998 | McShane et al. | 324/427 |
| 5,760,587 | A | 6/1998 | Harvey | 324/434 |
| 5,772,468 | A | 6/1998 | Kowalski et al. | 439/506 |
| 5,773,978 | A | 6/1998 | Becker | 324/430 |
| 5,778,326 | A | 7/1998 | Moroto et al. | 701/22 |
| 5,780,974 | A | 7/1998 | Pabla et al. | 315/82 |
| 5,780,980 | A | 7/1998 | Naito | 318/139 |
| 5,789,899 | A | 8/1998 | van Phuoc et al. | 320/112 |
| 5,793,359 | A | 8/1998 | Ushikubo | 345/169 |
| 5,796,239 | A | 8/1998 | van Phuoc et al. | 320/107 |
| 5,808,469 | A | 9/1998 | Kopera | 324/434 |
| 5,811,979 | A | 9/1998 | Rhein | 324/718 |
| 5,818,234 | A | 10/1998 | McKinnon | 324/433 |
| 5,820,407 | A | 10/1998 | Morse et al. | 439/504 |
| 5,821,756 | A | 10/1998 | McShane et al. | 324/430 |
| 5,821,757 | A | 10/1998 | Alvarez et al. | 324/434 |
| 5,825,174 | A | 10/1998 | Parker | 324/106 |
| 5,831,435 | A | 11/1998 | Troy | 324/426 |
| 5,832,396 | A | 11/1998 | Moroto et al. | 701/22 |
| 5,850,113 | A | 12/1998 | Weimer et al. | 307/125 |
| 5,862,515 | A | 1/1999 | Kobayashi et al. | 702/63 |
| 5,865,638 | A | 2/1999 | Trafton | 439/288 |
| 5,871,858 | A | 2/1999 | Thomsen et al. | 429/7 |
| 5,872,443 | A | 2/1999 | Williamson | 320/160 |
| 5,872,453 | A | 2/1999 | Shimoyama et al. | 324/431 |
| 5,883,306 | A | 3/1999 | Hwang | 73/146.8 |
| 5,895,440 | A | 4/1999 | Proctor et al. | 702/63 |
| 5,903,154 | A | 5/1999 | Zhang et al. | 324/437 |
| 5,903,716 | A | 5/1999 | Kimber et al. | 395/114 |
| 5,912,534 | A | 6/1999 | Benedict | 315/82 |
| 5,914,605 | A | 6/1999 | Bertness | 324/430 |
| 5,927,938 | A | 7/1999 | Hammerslag | 414/809 |
| 5,929,609 | A | 7/1999 | Joy et al. | 322/25 |
| 5,939,855 | A | 8/1999 | Proctor et al. | 320/104 |
| 5,939,861 | A | 8/1999 | Joko et al. | 320/122 |
| 5,945,829 | A | 8/1999 | Bertness | 324/430 |
| 5,946,605 | A | 8/1999 | Takahisa et al. | 455/68 |
| 5,951,229 | A | 9/1999 | Hammerslag | 414/398 |
| 5,961,561 | A | 10/1999 | Wakefield, II | 701/29 |
| 5,961,604 | A | 10/1999 | Anderson et al. | 709/229 |
| 5,969,625 | A | 10/1999 | Russo | 340/636.19 |
| 5,978,805 | A | 11/1999 | Carson | 707/10 |
| 5,982,138 | A | 11/1999 | Krieger | 320/105 |
| 6,002,238 | A | 12/1999 | Champlin | 320/134 |
| 6,005,759 | A | 12/1999 | Hart et al. | 361/66 |
| 6,008,652 | A | 12/1999 | Theofanopoulos et al. | 324/434 |
| 6,009,369 | A | 12/1999 | Boisvert et al. | 701/99 |

| | | | | | | | |
|---|---|---|---|---|---|---|---|
| 6,016,047 A | 1/2000 | Notten et al. | 320/137 | 6,351,102 B1 | 2/2002 | Troy | 320/139 |
| 6,031,354 A | 2/2000 | Wiley et al. | 320/116 | 6,356,042 B1 | 3/2002 | Kahlon et al. | 318/138 |
| 6,031,368 A | 2/2000 | Klippel et al. | 324/133 | 6,359,441 B1 | 3/2002 | Bertness | 324/426 |
| 6,037,745 A | 3/2000 | Koike et al. | 320/104 | 6,359,442 B1 | 3/2002 | Henningson et al. | 324/426 |
| 6,037,749 A | 3/2000 | Parsonage | 320/132 | 6,363,303 B1 | 3/2002 | Bertness | 701/29 |
| 6,037,751 A | 3/2000 | Klang | 320/160 | RE37,677 E | 4/2002 | Irie | 315/83 |
| 6,037,777 A | 3/2000 | Champlin | 324/430 | 6,377,031 B1 | 4/2002 | Karuppana et al. | 323/220 |
| 6,037,778 A | 3/2000 | Makhija | 324/433 | 6,384,608 B1 | 5/2002 | Namaky | 324/430 |
| 6,046,514 A | 4/2000 | Rouillard et al. | 307/77 | 6,388,448 B1 | 5/2002 | Cervas | 324/426 |
| 6,051,976 A | 4/2000 | Bertness | 324/426 | 6,392,414 B2 | 5/2002 | Bertness | 324/429 |
| 6,055,468 A | 4/2000 | Kaman et al. | 701/29 | 6,396,278 B1 | 5/2002 | Makhija | 324/402 |
| 6,061,638 A | 5/2000 | Joyce | 702/63 | 6,407,554 B1 | 6/2002 | Godau et al. | 324/503 |
| 6,064,372 A | 5/2000 | Kahkoska | 345/173 | 6,411,098 B1 | 6/2002 | Laletin | 324/436 |
| 6,072,299 A | 6/2000 | Kurle et al. | 320/112 | 6,417,669 B1 | 7/2002 | Champlin | 324/426 |
| 6,072,300 A | 6/2000 | Tsuji | 320/116 | 6,424,157 B1 | 7/2002 | Gollomp et al. | 324/430 |
| 6,081,098 A | 6/2000 | Bertness et al. | 320/134 | 6,424,158 B2 | 7/2002 | Klang | 324/433 |
| 6,081,109 A | 6/2000 | Seymour et al. | 324/127 | 6,437,957 B1 | 8/2002 | Karuppana et al. | 361/78 |
| 6,087,815 A | 7/2000 | Pfeifer et al. | 323/282 | 6,441,585 B1 | 8/2002 | Bertness | 320/132 |
| 6,091,238 A | 7/2000 | McDermott | 324/207.2 | 6,445,158 B1 | 9/2002 | Bertness et al. | 320/104 |
| 6,091,245 A | 7/2000 | Bertness | 324/426 | 6,449,726 B1 | 9/2002 | Smith | 713/340 |
| 6,094,033 A | 7/2000 | Ding et al. | 320/132 | 6,456,036 B1 | 9/2002 | Thandiwe | 320/106 |
| 6,100,670 A | 8/2000 | Levesque | 320/150 | 6,456,045 B1 | 9/2002 | Troy et al. | 320/139 |
| 6,104,167 A | 8/2000 | Bertness et al. | 320/132 | 6,465,908 B1 | 10/2002 | Karuppana et al. | 307/31 |
| 6,113,262 A | 9/2000 | Purola et al. | 374/45 | 6,466,025 B1 | 10/2002 | Klang | 324/429 |
| 6,114,834 A | 9/2000 | Parise | 320/109 | 6,466,026 B1 | 10/2002 | Champlin | 324/430 |
| 6,137,269 A | 10/2000 | Champlin | 320/150 | 6,469,511 B1 | 10/2002 | Vonderhaar et al. | 324/425 |
| 6,140,797 A | 10/2000 | Dunn | 320/105 | 6,477,478 B1 | 11/2002 | Jones et al. | 702/102 |
| 6,144,185 A | 11/2000 | Dougherty et al. | 320/132 | 6,495,990 B2 | 12/2002 | Champlin | 320/132 |
| 6,150,793 A | 11/2000 | Lesesky et al. | 320/104 | 6,497,209 B1 | 12/2002 | Karuppana et al. | 123/179.3 |
| 6,158,000 A | 12/2000 | Collins | 713/1 | 6,500,025 B1 | 12/2002 | Moenkhaus et al. | 439/502 |
| 6,161,640 A | 12/2000 | Yamaguchi | 180/65.8 | 6,505,507 B1 | 1/2003 | Imao | 73/146.5 |
| 6,163,156 A | 12/2000 | Bertness | 324/426 | 6,507,196 B2 | 1/2003 | Thomsen et al. | 324/436 |
| 6,164,063 A | 12/2000 | Mendler | 60/274 | 6,526,361 B1 | 2/2003 | Jones et al. | 702/63 |
| 6,167,349 A | 12/2000 | Alvarez | 702/63 | 6,529,723 B1 | 3/2003 | Bentley | 455/405 |
| 6,172,483 B1 | 1/2001 | Champlin | 320/134 | 6,531,848 B1 | 3/2003 | Chitsazan et al. | 320/153 |
| 6,172,505 B1 | 1/2001 | Bertness | 324/430 | 6,532,425 B1 | 3/2003 | Boost et al. | 702/63 |
| 6,177,737 B1 | 1/2001 | Palfey et al. | 307/64 | 6,534,993 B2 | 3/2003 | Bertness | 324/433 |
| 6,181,545 B1 | 1/2001 | Amatucci et al. | 361/502 | 6,544,078 B2 | 4/2003 | Palmisano et al. | 439/762 |
| 6,211,651 B1 | 4/2001 | Nemoto | 320/133 | 6,545,599 B2 | 4/2003 | Derbyshire et al. | 340/442 |
| 6,215,275 B1 | 4/2001 | Bean | 320/106 | 6,556,019 B2 | 4/2003 | Bertness | 324/426 |
| 6,218,936 B1 | 4/2001 | Imao | 340/447 | 6,566,883 B1 | 5/2003 | Vonderhaar et al. | 324/426 |
| 6,222,342 B1 | 4/2001 | Eggert et al. | 320/105 | 6,570,385 B1 | 5/2003 | Roberts et al. | 324/378 |
| 6,222,369 B1 | 4/2001 | Champlin | 324/430 | 6,577,107 B2 | 6/2003 | Kechmire | 320/139 |
| D442,503 S | 5/2001 | Lundbeck et al. | D10/77 | 6,586,941 B2 | 7/2003 | Bertness et al. | 324/426 |
| 6,225,808 B1 | 5/2001 | Varghese et al. | 324/426 | 6,597,150 B1 | 7/2003 | Bertness et al. | 320/104 |
| 6,236,332 B1 | 5/2001 | Conkright et al. | 340/3.1 | 6,599,243 B2 | 7/2003 | Woltermann et al. | 600/300 |
| 6,238,253 B1 | 5/2001 | Qualls | 439/759 | 6,600,815 B1 | 7/2003 | Walding | 379/93.07 |
| 6,242,887 B1 | 6/2001 | Burke | 320/104 | 6,611,740 B2 | 8/2003 | Lowrey et al. | 701/29 |
| 6,249,124 B1 | 6/2001 | Bertness | 324/426 | 6,618,644 B2 * | 9/2003 | Bean | 700/231 |
| 6,250,973 B1 | 6/2001 | Lowery et al. | 439/763 | 6,621,272 B2 | 9/2003 | Champlin | 324/426 |
| 6,254,438 B1 | 7/2001 | Gaunt | 439/755 | 6,623,314 B1 | 9/2003 | Cox et al. | 439/759 |
| 6,259,170 B1 | 7/2001 | Limoge et al. | 307/10.8 | 6,624,635 B1 | 9/2003 | Lui | 24/426 |
| 6,259,254 B1 | 7/2001 | Klang | 324/427 | 6,628,011 B2 | 9/2003 | Droppo et al. | 307/43 |
| 6,262,563 B1 | 7/2001 | Champlin | 320/134 | 6,629,054 B2 | 9/2003 | Makhija et al. | 702/113 |
| 6,263,268 B1 | 7/2001 | Nathanson | 701/29 | 6,633,165 B2 | 10/2003 | Bertness | 324/426 |
| 6,271,643 B1 | 8/2001 | Becker et al. | 320/112 | 6,635,974 B1 | 10/2003 | Karuppana et al. | 307/140 |
| 6,271,748 B1 | 8/2001 | Derbyshire et al. | 340/442 | 6,667,624 B1 | 12/2003 | Raichle et al. | 324/522 |
| 6,275,008 B1 | 8/2001 | Arai et al. | 320/132 | 6,679,212 B2 | 1/2004 | Kelling | 123/179.28 |
| 6,294,896 B1 | 9/2001 | Champlin | 320/134 | 6,686,542 B2 | 2/2004 | Zhang | 174/74 |
| 6,294,897 B1 | 9/2001 | Champlin | 320/153 | 6,696,819 B2 | 2/2004 | Bertness | 320/134 |
| 6,304,087 B1 | 10/2001 | Bertness | 324/426 | 6,707,303 B2 | 3/2004 | Bertness et al. | 324/426 |
| 6,307,349 B1 | 10/2001 | Koenck et al. | 320/112 | 6,736,941 B2 | 5/2004 | Oku et al. | 203/68 |
| 6,310,481 B2 | 10/2001 | Bertness | 324/430 | 6,737,831 B2 | 5/2004 | Champlin | 320/132 |
| 6,313,607 B1 | 11/2001 | Champlin | 320/132 | 6,738,697 B2 | 5/2004 | Breed | 701/29 |
| 6,313,608 B1 | 11/2001 | Varghese et al. | 320/132 | 6,740,990 B2 | 5/2004 | Tozuka et al. | 307/9.1 |
| 6,316,914 B1 | 11/2001 | Bertness | 320/134 | 6,744,149 B1 | 6/2004 | Karuppana et al. | 307/31 |
| 6,320,351 B1 | 11/2001 | Ng et al. | 320/104 | 6,745,153 B2 | 6/2004 | White et al. | 702/184 |
| 6,323,650 B1 | 11/2001 | Bertness et al. | 324/426 | 6,759,849 B2 | 7/2004 | Bertness | 324/426 |
| 6,329,793 B1 | 12/2001 | Bertness et al. | 320/132 | 6,777,945 B2 | 8/2004 | Roberts et al. | 324/426 |
| 6,331,762 B1 | 12/2001 | Bertness | 320/134 | 6,781,382 B2 | 8/2004 | Johnson | 324/426 |
| 6,332,113 B1 | 12/2001 | Bertness | 702/63 | 6,784,635 B2 | 8/2004 | Larson | 320/104 |
| 6,346,795 B2 | 2/2002 | Haraguchi et al. | 320/136 | 6,784,637 B2 | 8/2004 | Raichle et al. | 320/107 |
| 6,347,958 B1 | 2/2002 | Tsai | 439/488 | 6,788,025 B2 | 9/2004 | Bertness et al. | 320/104 |

| | | |
|---|---|---|
| 6,795,782 B2 | 9/2004 | Bertness et al. ............... 702/63 |
| 6,796,841 B1 | 9/2004 | Cheng et al. ............. 439/620.3 |
| 6,805,090 B2 | 10/2004 | Bertness et al. ............. 123/198 |
| 6,806,716 B2 | 10/2004 | Bertness et al. ............. 324/426 |
| 6,825,669 B2 | 11/2004 | Raichle et al. .............. 324/426 |
| 6,842,707 B2 | 1/2005 | Raichle et al. ................ 702/62 |
| 6,850,037 B2 | 2/2005 | Bertness ..................... 320/132 |
| 6,871,151 B2 | 3/2005 | Bertness ...................... 702/63 |
| 6,885,195 B2 | 4/2005 | Bertness ..................... 324/426 |
| 6,888,468 B2 | 5/2005 | Bertness ................ 340/636.15 |
| 6,891,378 B2 | 5/2005 | Bertness et al. .............. 324/426 |
| 6,904,796 B2 | 6/2005 | Pacsai et al. ............... 73/146.8 |
| 6,906,522 B2 | 6/2005 | Bertness et al. .............. 324/426 |
| 6,906,523 B2 | 6/2005 | Bertness et al. .............. 324/426 |
| 6,906,624 B2 | 6/2005 | McClelland et al. ........ 340/442 |
| 6,909,287 B2 | 6/2005 | Bertness ..................... 324/426 |
| 6,913,483 B2 | 7/2005 | Restaino et al. ............. 439/504 |
| 6,914,413 B2 | 7/2005 | Bertness et al. .............. 320/104 |
| 6,919,725 B2 | 7/2005 | Bertness et al. .............. 324/433 |
| 6,930,485 B2 | 8/2005 | Bertness et al. .............. 324/426 |
| 6,933,727 B2 | 8/2005 | Bertness et al. .............. 324/426 |
| 6,941,234 B2 | 9/2005 | Bertness et al. ............... 702/63 |
| 6,967,484 B2 | 11/2005 | Bertness ..................... 324/426 |
| 6,998,847 B2 | 2/2006 | Bertness et al. .............. 324/426 |
| 7,003,410 B2 | 2/2006 | Bertness et al. ............... 702/63 |
| 7,003,411 B2* | 2/2006 | Bertness ...................... 702/63 |
| 7,012,433 B2 | 3/2006 | Smith et al. ................. 324/426 |
| 7,058,525 B2 | 6/2006 | Bertness et al. ............... 702/63 |
| 7,081,755 B2 | 7/2006 | Klang et al. ................. 324/426 |
| 7,106,070 B2 | 9/2006 | Bertness et al. .............. 324/538 |
| 7,116,109 B2 | 10/2006 | Klang ......................... 324/426 |
| 7,119,686 B2 | 10/2006 | Bertness et al. .......... 340/572.1 |
| 7,126,341 B2 | 10/2006 | Bertness et al. .............. 324/426 |
| 7,129,706 B2 | 10/2006 | Kalley ........................ 324/426 |
| 7,272,519 B2 | 9/2007 | Lesesky et al. ................ 702/63 |
| 2002/0004694 A1 | 1/2002 | Mcleod ........................ 701/29 |
| 2002/0010558 A1 | 1/2002 | Bertness et al. ................ 702/63 |
| 2002/0041175 A1 | 4/2002 | Lauper et al. ................ 320/106 |
| 2002/0044050 A1 | 4/2002 | Derbyshire et al. ......... 340/442 |
| 2002/0171428 A1* | 11/2002 | Bertness ..................... 324/426 |
| 2002/0176010 A1 | 11/2002 | Wallach et al. .............. 348/362 |
| 2003/0009270 A1 | 1/2003 | Breed ........................... 701/29 |
| 2003/0025481 A1 | 2/2003 | Bertness ..................... 324/427 |
| 2003/0036909 A1 | 2/2003 | Kato ........................... 704/275 |
| 2003/0088375 A1 | 5/2003 | Bertness et al. ................ 702/63 |
| 2003/0169018 A1 | 9/2003 | Berels et al. ................. 320/132 |
| 2003/0184262 A1 | 10/2003 | Makhija ..................... 320/156 |
| 2003/0184306 A1 | 10/2003 | Bertness et al. .............. 324/426 |
| 2003/0187556 A1* | 10/2003 | Suzuki ......................... 701/29 |
| 2003/0194672 A1 | 10/2003 | Roberts et al. .............. 431/196 |
| 2003/0214395 A1 | 11/2003 | Flowerday et al. .......... 340/445 |
| 2004/0000590 A1 | 1/2004 | Raichle et al. ......... 235/462.01 |
| 2004/0000891 A1 | 1/2004 | Raichle et al. .............. 320/107 |
| 2004/0000893 A1 | 1/2004 | Raichle et al. .............. 320/135 |
| 2004/0002824 A1 | 1/2004 | Raichle et al. ................ 702/63 |
| 2004/0002825 A1 | 1/2004 | Raichle et al. ................ 702/63 |
| 2004/0002836 A1 | 1/2004 | Raichle et al. .............. 702/188 |
| 2004/0032264 A1 | 2/2004 | Schoch ....................... 324/426 |
| 2004/0044452 A1 | 3/2004 | Bauer et al. ................... 703/33 |
| 2004/0049361 A1 | 3/2004 | Hamdan et al. ............. 702/115 |
| 2004/0051533 A1 | 3/2004 | Namaky ..................... 324/426 |
| 2004/0054503 A1 | 3/2004 | Namaky ..................... 702/182 |
| 2004/0113588 A1 | 6/2004 | Mikuriya et al. ............ 320/128 |
| 2004/0145342 A1 | 7/2004 | Lyon .......................... 320/108 |
| 2004/0178185 A1 | 9/2004 | Yoshikawa et al. .......... 219/270 |
| 2004/0239332 A1 | 12/2004 | Mackel et al. ............... 324/426 |
| 2005/0043868 A1 | 2/2005 | Mitcham ...................... 701/29 |
| 2005/0102073 A1 | 5/2005 | Ingram ........................ 701/29 |
| 2005/0182536 A1 | 8/2005 | Doyle et al. .................. 701/29 |
| 2005/0254106 A9 | 11/2005 | Silverbrook et al. ........ 358/539 |
| 2005/0256617 A1 | 11/2005 | Cawthorne et al. ............ 701/22 |
| 2006/0030980 A1 | 2/2006 | St. Denis ...................... 701/29 |
| 2006/0089767 A1 | 4/2006 | Sowa ........................... 701/29 |
| 2006/0217914 A1 | 9/2006 | Bertness ..................... 702/113 |
| 2006/0282323 A1* | 12/2006 | Walker et al. ................. 705/14 |
| 2007/0026916 A1* | 2/2007 | Juds et al. ...................... 463/1 |

FOREIGN PATENT DOCUMENTS

| | | |
|---|---|---|
| EP | 0 022 450 A1 | 1/1981 |
| EP | 0 637 754 A1 | 2/1995 |
| EP | 0 772 056 A1 | 5/1997 |
| EP | 0 982 159 A2 | 3/2000 |
| FR | 2 749 397 | 12/1997 |
| GB | 2 029 586 | 3/1980 |
| GB | 2 088 159 A | 6/1982 |
| GB | 2 246 916 A | 10/1990 |
| GB | 2 275 783 A | 7/1994 |
| GB | 2 387 235 A | 10/2003 |
| JP | 59-17892 | 1/1984 |
| JP | 59-17893 | 1/1984 |
| JP | 59-17894 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04095788 | 3/1992 |
| JP | 04131779 | 5/1992 |
| JP | 04372536 | 12/1992 |
| JP | 05211724 A | 8/1993 |
| JP | 5216550 | 8/1993 |
| JP | 7-128414 | 5/1995 |
| JP | 09061505 | 3/1997 |
| JP | 10056744 | 2/1998 |
| JP | 10232273 | 9/1998 |
| JP | 11103503 A | 4/1999 |
| RU | 2089015 C1 | 8/1997 |
| WO | WO 93/22666 | 11/1993 |
| WO | WO 94/05069 | 3/1994 |
| WO | WO 96/01456 | 1/1996 |
| WO | WO 96/06747 | 3/1996 |
| WO | WO 97/44652 | 11/1997 |
| WO | WO 98/04910 | 2/1998 |
| WO | WO 98/58270 | 12/1998 |
| WO | WO 99/23738 | 5/1999 |
| WO | WO 00/16083 | 3/2000 |
| WO | WO 00/62049 | 10/2000 |
| WO | WO 00/67359 | 11/2000 |
| WO | WO 01/59443 | 2/2001 |
| WO | WO 01/16614 | 3/2001 |
| WO | WO 01/16615 | 3/2001 |
| WO | WO 01/51947 | 7/2001 |
| WO | WO 03/047064 A3 | 6/2003 |
| WO | WO 03/076960 A1 | 9/2003 |
| WO | WO 2004/047215 A1 | 6/2004 |

OTHER PUBLICATIONS

"Battery Impedance", by E. Willihnganz et al., *Electrical Engineering*, Sep. 1959, pp. 922-925.

"Determining The End of Battery Life", by S. DeBardelaben, *IEEE*, 1986, pp. 365-368.

"A Look at the Impedance of a Cell", by S. Debardelaben, *IEEE*, 1988, pp. 394-397.

"The Impedance of Electrical Storage Cells", by N.A. Hampson et al., *Journal of Applied Electrochemistry*, 1980, pp. 3-11.

"A Package for Impedance/Admittance Data Analysis", by B. Boukamp, *Solid State Ionics*, 1986, pp. 136-140.

"Precision of Impedance Spectroscopy Estimates of Bulk, Reaction Rate, and Diffusion Parameters", by J. Macdonald et al., *J. Electroanal, Chem.*, 1991, pp. 1-11.

Internal Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128,131.

IEEE Recommended Practice for Maintenance, Testings, and Replacement of Large Lead Storage Batteries for Generating Stations and Substations, *The Institute of Electrical and Electronics Engineers, Inc., ANSI/IEEE Std.* 450-1987, Mar. 9, 1987, pp. 7-15.

"Field and Laboratory Studies to Assess the State of Health of Valve-Regulated Lead Acid Batteries: Part I Conductance/Capacity Correlation Studies", by D. Feder et al., *IEEE*, Aug. 1992, pp. 218-233.

"JIS Japanese Industrial Standard-Lead Acid Batteries for Automobiles", *Japenese Standards Association UDC*, 621.355.2:629.113. 006, Nov. 1995.

"Performance of Dry Cells", by C. Hambuechen, Preprint of *Am. Electrochem. Soc.*, Apr. 18-20, 1912, paper No. 19, pp. 1-5.

"A Bridge for Measuring Storage Battery Resistance", by E. Willihncanz, *The Electrochemical Society*, preprint 79-20, Apr. 1941, pp. 253-258.

National Semiconductor Corporation, "High Q Notch Filter", Mar. 1969, Linear Brief 5, Mar. 1969.

Burr-Brown Corporation, "Design A 60 Hz Notch Filter with the UAF42", Jan. 1994, AB-071, 1994.

National Semiconductor Corporation, "LMF90-4$^{th}$-Order Elliptic Notch Filter", Dec. 1994, RRD-B30M115, Dec. 1994.

"Alligator Clips with Wire Penetrators" *J.S. Popper, Inc.* product information, downloaded from http://www.jspopper.com/, undated.

"#: LM78S40 Simple Switcher DC to DC Converter", *ITM e-Catalog*, downloaded from http://www.pcbcafe.com, undated.

"Simple DC-DC Converts Allows Use of Single Battery", *Electronix Express*, downloaded from http://www.elexp.com/t_dc-dc.htm, undated.

"DC-DC Converter Basics", *Power Designers*, downloaded from http://www.powederdesigners.com/InforWeb.design center/articles/DC-DC/converter.shtm, undated.

"Notification of Transmittal of The International Search Report or the Declaration", PCT/US02/29461.

"Notification of Transmittal of The International Search Report or the Declaration", PCT/US03/07546.

"Notification of Transmittal of The International Search Report or the Declaration", PCT/US03/06577.

"Notification of Transmittal of The International Search Report or the Declaration", PCT/US03/07837.

"Improved Impedance Spectroscopy Technique for Status Determination of Production Li/SO$_2$ Batteries" Terrill Atwater et al., pp. 10-113, (1992).

"Notification of Transmittal of The International Search Report or the Declaration", PCT/US03/41561.

"Notification of Transmittal of The International Search Report or the Declaration", PCT/US03/27696.

"Programming Training Course, 62-000 Series Smart Engine Analyzer", Testproducts Division, Kalamazoo, Michigan, pp. 1-207, (1984).

"Operators Manual, Modular Computer Analyzer Model MCA 3000", Sun Electric Corporation, Crystal Lake, Illinois, pp. 1-1-14-13, (1991).

Supplementary European Search Report Communication for Appl. No. 99917402.2.

"Dynamic modelling of lead/acid batteries using impedance spectroscopy for parameter indentification", Journal of Power Sources, pp. 69-84, (1997).

Notification of Transmittal of the International Search Report PCT/US03/30707.

"A review of impedance measurements for determination of the state-of-charge or state-of-health of secondary batteries", Journal of Power Sources, pp. 59-69, (1998).

"Search Report Under Section 17" for Great Britain Application No. GB0421447.4.

"Results of Discrete Frequency Immittance Spectroscopy (DFIS) Measurements of Lead Acid Batteries", by K.S. Champlin et al., *Proceedings of 23$^{rd}$ International Teleco Conference (INTELEC)*, published Oct. 2001, IEE, pp. 433-440.

"Examination Report" from the U.K. Patent Office for U.K. App. No. 0417678.0.

Wikipedia Online Encyclopedia, Inductance, 2005, http://en.wikipedia.org/wiki/inductance, pp. 1-5, mutual Inductance, pp. 3,4.

Young Illustrated Encyclopedia Dictionary of Electronics, 1981, Parker Publishing Company, Inc., pp. 318-319.

* cited by examiner

BATTERY TESTER WITH PROMOTION FEATURE TO PROMOTE USE OF THE BATTERY TESTER BY PROVIDING THE USER WITH CODES HAVING REDEEMABLE VALUE

BACKGROUND OF THE INVENTION

The present invention relates to storage batteries, such as lead acid storage batteries. More specifically, the present invention relates to battery maintenance equipment for use with such storage batteries.

Storage batteries, such as lead acid storage batteries of the type used in the automotive industry, have existed for many years. However, understanding the nature of such storage batteries, how such storage batteries operate and how to accurately test such batteries has been an ongoing endeavor and has proved quite difficult. Storage batteries consist of a plurality of individual storage cells electrically connected in series. Typically each cell has a voltage potential of about 2.1 volts. By connecting the cells in series, the voltages of the individual cells are added in a cumulative manner. For example, in a typical automotive storage battery, six storage cells are used to provide a total voltage when the battery is fully charged of 12.6 volts.

There has been a long history of attempts to accurately test the condition of storage batteries. A simple test is to measure the voltage of the battery. If the voltage is below a certain threshold, the battery is determined to be bad. However, this test is inconvenient because it requires the battery to be charged prior to performing the test. If the battery is discharged, the voltage will be low and a good battery may be incorrectly tested as bad. Furthermore, such a test does not give any indication of how much energy is stored in the battery. Another technique for testing a battery is referred as a load test. In a load test, the battery is discharged using a known load. As the battery is discharged, the voltage across the battery is monitored and used to determine the condition of the battery. This technique requires that the battery be sufficiently charged in order that it can supply current to the load.

More recently, techniques have been pioneered by Dr. Keith S. Champlin and Midtronics Inc. for testing storage batteries by measuring the conductance of the batteries. This technique is described in a number of United States patents obtained by Dr. Champlin and Midtronics, Inc., for example, U.S. Pat. No. 3,873,911, issued Mar. 25, 1975, to Champlin; U.S. Pat. No. 3,909,708, issued Sep. 30, 1975, to Champlin; U.S. Pat. No. 4,816,768, issued Mar. 28, 1989, to Champlin; U.S. Pat. No. 4,825,170, issued Apr. 25, 1989, to Champlin; U.S. Pat. No. 4,881,038, issued Nov. 14, 1989, to Champlin; U.S. Pat. No. 4,912,416, issued Mar. 27, 1990, to Champlin; U.S. Pat. No. 5,140,269, issued Aug. 18, 1992, to Champlin; U.S. Pat. No. 5,343,380, issued Aug. 30, 1994; U.S. Pat. No. 5,572,136, issued Nov. 5, 1996; U.S. Pat. No. 5,574,355, issued Nov. 12, 1996; U.S. Pat. No. 5,585,416, issued Dec. 10, 1996; U.S. Pat. No. 5,585,728, issued Dec. 17, 1996; U.S. Pat. No. 5,589,757, issued Dec. 31, 1996; U.S. Pat. No. 5,592,093, issued Jan. 7, 1997; U.S. Pat. No. 5,598,098, issued Jan. 28, 1997; U.S. Pat. No. 5,656,920, issued Aug. 12, 1997; U.S. Pat. No. 5,757,192, issued May 26, 1998; U.S. Pat. No. 5,821,756, issued Oct. 13, 1998; U.S. Pat. No. 5,831,435, issued Nov. 3, 1998; U.S. Pat. No. 5,871,858, issued Feb. 16, 1999; U.S. Pat. No. 5,914,605, issued Jun. 22, 1999; U.S. Pat. No. 5,945,829, issued Aug. 31, 1999; U.S. Pat. No. 6,002,238, issued Dec. 14, 1999; U.S. Pat. No. 6,037,751, issued Mar. 14, 2000; U.S. Pat. No. 6,037,777, issued Mar. 14, 2000; U.S. Pat. No. 6,051,976, issued Apr. 18, 2000; U.S. Pat. No. 6,081,098, issued Jun. 27, 2000; U.S. Pat. No. 6,091,245, issued Jul. 18, 2000; U.S. Pat. No. 6,104,167, issued Aug. 15, 2000; U.S. Pat. No. 6,137,269, issued Oct. 24, 2000; U.S. Pat. No. 6,163,156, issued Dec. 19, 2000; U.S. Pat. No. 6,172,483, issued Jan. 9, 2001; U.S. Pat. No. 6,172,505, issued Jan. 9, 2001; U.S. Pat. No. 6,222,369, issued Apr. 24, 2001; U.S. Pat. No. 6,225,808, issued May 1, 2001; U.S. Pat. No. 6,249,124, issued Jun. 19, 2001; U.S. Pat. No. 6,259,254, issued Jul. 10, 2001; U.S. Pat. No. 6,262,563, issued Jul. 17, 2001; U.S. Pat. No. 6,294,896, issued Sep. 25, 2001; U.S. Pat. No. 6,294,897, issued Sep. 25, 2001; U.S. Pat. No. 6,304,087, issued Oct. 16, 2001; U.S. Pat. No. 6,310,481, issued Oct. 30, 2001; U.S. Pat. No. 6,313,607, issued Nov. 6, 2001; U.S. Pat. No. 6,313,608, issued Nov. 6, 2001; U.S. Pat. No. 6,316,914, issued Nov. 13, 2001; U.S. Pat. No. 6,323,650, issued Nov. 27, 2001; U.S. Pat. No. 6,329,793, issued Dec. 11, 2001; U.S. Pat. No. 6,331,762, issued Dec. 18, 2001; U.S. Pat. No. 6,332,113, issued Dec. 18, 2001; U.S. Pat. No. 6,351,102, issued Feb. 26, 2002; U.S. Pat. No. 6,359,441, issued Mar. 19, 2002; U.S. Pat. No. 6,363,303, issued Mar. 26, 2002; U.S. Pat. No. 6,377,031, issued Apr. 23, 2002; U.S. Pat. No. 6,392,414, issued May 21, 2002; U.S. Pat. No. 6,417,669, issued Jul. 9, 2002; U.S. Pat. No. 6,424,158, issued Jul. 23, 2002; U.S. Pat. No. 6,441,585, issued Aug. 17, 2002; U.S. Pat. No. 6,437,957, issued Aug. 20, 2002; U.S. Pat. No. 6,445,158, issued Sep. 3, 2002; U.S. Pat. No. 6,456,045; U.S. Pat. No. 6,466,025, issued Oct. 15, 2002; U.S. Pat. No. 6,465,908, issued Oct. 15, 2002; U.S. Pat. No. 6,466,026, issued Oct. 15, 2002; U.S. Pat. No. 6,469,511, issued Nov. 22, 2002; U.S. Pat. No. 6,495,990, issued Dec. 17, 2002; U.S. Pat. No. 6,497,209, issued Dec. 24, 2002; U.S. Pat. No. 6,507,196, issued Jan. 14, 2003; U.S. Pat. No. 6,534,993; issued Mar. 18, 2003; U.S. Pat. No. 6,544,078, issued Apr. 8, 2003; U.S. Pat. No. 6,556,019, issued Apr. 29, 2003; U.S. Pat. No. 6,566,883, issued May 20, 2003; U.S. Pat. No. 6,586,941, issued Jul. 1, 2003; U.S. Pat. No. 6,597,150, issued Jul. 22, 2003; U.S. Pat. No. 6,621,272, issued Sep. 16, 2003; U.S. Pat. No. 6,623,314, issued Sep. 23, 2003; U.S. Pat. No. 6,633,165, issued Oct. 14, 2003; U.S. Pat. No. 6,635,974, issued Oct. 21, 2003; U.S. Pat. No. 6,707,303, issued Mar. 16, 2004; U.S. Pat. No. 6,737,831, issued May 18, 2004; U.S. Pat. No. 6,744,149, issued Jun. 1, 2004; U.S. Pat. No. 6,759,849, issued Jul. 6, 2004; U.S. Pat. No. 6,781,382, issued Aug. 24, 2004; U.S. Pat. No. 6,788,025, filed Sep. 7, 2004; U.S. Pat. No. 6,795,782, issued Sep. 21, 2004; U.S. Pat. No. 6,805,090, filed Oct. 19, 2004; U.S. Pat. No. 6,806,716, filed Oct. 19, 2004; U.S. Pat. No. 6,850,037, filed Feb. 1, 2005; U.S. Pat. No. 6,850,037, issued Feb. 1, 2005; U.S. Pat. No. 6,871,151, issued Mar. 22, 2005; U.S. Pat. No. 6,885,195, issued Apr. 26, 2005; U.S. Pat. No. 6,888,468, issued May 3, 2005; U.S. Pat. No. 6,891,378, issued May 10, 2005; U.S. Pat. No. 6,906,522, issued Jun. 14, 2005; U.S. Pat. No. 6,906,523, issued Jun. 14, 2005; U.S. Pat. No. 6,909,287, issued Jun. 21, 2005; U.S. Pat. No. 6,914,413, issued Jul. 5, 2005; U.S. Pat. No. 6,913,483, issued Jul. 5, 2005; U.S. Pat. No. 6,930,485, issued Aug. 16, 2005; U.S. Pat. No. 6,933,727, issued Aug. 23, 2000; U.S. Pat. No. 6,941,234, filed Sep. 6, 2005; U.S. Pat. No. 6,967,484, issued Nov. 22, 2005; U.S. Pat. No. 6,998,847, issued Feb. 14, 2006; U.S. Pat. No. 7,003,410, issued Feb. 21, 2006; U.S. Pat. No. 7,003,411, issued Feb. 21, 2006; U.S. Pat. No. 7,012,433, issued Mar. 14, 2006; U.S. Pat. No. 7,015,674, issued Mar. 21, 2006; U.S. Pat. No. 7,034,541, issued Apr. 25, 2006; U.S. Pat. No. 7,039,533, issued May 2, 2006; U.S. Pat. No. 7,058,525, issued Jun. 6, 2006; U.S. Pat. No. 7,081,755, issued Jul. 25, 2006; U.S. Pat. No. 7,106,070, issued Sep. 12, 2006; U.S. Pat. No. 7,116,109, issued Oct. 3, 2006; U.S. Pat. No. 7,119,686, issued Oct. 10, 2006; and U.S. Pat. No. 7,126, 341, issued Oct. 24, 2006; U.S. Ser. No. 09/780,146, filed Feb. 9, 2001, entitled STORAGE BATTERY WITH INTEGRAL BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/880,473, filed Jun. 13, 2001; entitled BATTERY TEST MODULE; U.S. Ser. No. 09/993,468, filed Nov. 14, 2001, entitled KELVIN CONNECTOR FOR A BATTERY POST; U.S. Ser. No. 10/042,451, filed Jan. 8, 2002, entitled BATTERY CHARGE CONTROL DEVICE; U.S. Ser. No. 10/109,734, filed Mar. 28, 2002, entitled APPARATUS AND METHOD FOR COUNTERACTING SELF DISCHARGE IN A STORAGE BATTERY; U.S. Ser. No. 10/112,998, filed Mar. 29, 2002, entitled BATTERY TESTER WITH BATTERY REPLACEMENT OUTPUT; U.S. Ser. No. 10/263,473, filed Oct. 2, 2002, entitled ELECTRONIC BATTERY TESTER WITH RELATIVE TEST OUTPUT; U.S. Ser. No. 10/310,385, filed Dec. 5, 2002, entitled BATTERY TEST MODULE; U.S. Ser. No. 10/462,323, filed Jun. 16, 2003, entitled ELECTRONIC BATTERY TESTER HAVING A USER INTERFACE TO CONFIGURE A PRINTER; U.S. Ser. No. 10/653,342, filed Sep. 2, 2003, entitled ELECTRONIC BATTERY TESTER CONFIGURED TO PREDICT A LOAD TEST RESULT; U.S. Ser. No. 10/656,526, filed Sep. 5, 2003, entitled METHOD AND APPARATUS FOR MEASURING A PARAMETER OF A VEHICLE ELECTRICAL SYSTEM; U.S. Ser. No. 10/441,271, filed May 19, 2003, entitled ELECTRONIC BATTERY TESTER; U.S. Ser. No. 09/653,963, filed Sep. 1, 2000, entitled SYSTEM AND METHOD FOR CONTROLLING POWER GENERATION AND STORAGE; U.S. Ser. No. 10/174,110, filed Jun. 18, 2002, entitled DAYTIME RUNNING LIGHT CONTROL USING AN INTELLIGENT POWER MANAGEMENT SYSTEM; U.S. Ser. No. 10/258,441, filed Apr. 9, 2003, entitled CURRENT MEASURING CIRCUIT SUITED FOR BATTERIES; U.S. Ser. No. 10/681,666, filed Oct. 8, 2003, entitled ELECTRONIC BATTERY TESTER WITH PROBE LIGHT; U.S. Ser. No. 10/748,792, filed Dec. 30, 2003, entitled APPARATUS AND METHOD FOR PREDICTING THE REMAINING DISCHARGE TIME OF A BATTERY; U.S. Ser. No. 10/783,682, filed Feb. 20, 2004, entitled REPLACEABLE CLAMP FOR ELECTRONIC BATTERY TESTER; U.S. Ser. No. 10/791,141, filed Mar. 2, 2004, entitled METHOD AND APPARATUS FOR AUDITING A BATTERY TEST; U.S. Ser. No. 10/864,904, filed Jun. 9, 2004, entitled ALTERNATOR TESTER; U.S. Ser. No. 10/867,385, filed Jun. 14, 2004, entitled ENERGY MANAGEMENT SYSTEM FOR AUTOMOTIVE VEHICLE; U.S. Ser. No. 10/896,834, filed Jul. 22, 2004, entitled ELECTRONIC BATTERY TESTER; U.S. Ser. No. 10/897,801, filed Jul. 23, 2004, entitled SHUNT CONNECTION TO A PCB FOR AN ENERGY MANAGEMENT SYSTEM EMPLOYED IN AN AUTOMOTIVE VEHICLE; U.S. Ser. No. 10/958,821, filed Oct. 5, 2004, entitled IN-VEHICLE BATTERY MONITOR; U.S. Ser. No. 10/958,812, filed Oct. 5, 2004, entitled SCAN TOOL FOR ELECTRONIC BATTERY TESTER; U.S. Ser. No. 11/008,456, filed Dec. 9, 2004, entitled APPARATUS AND METHOD FOR PREDICTING BATTERY CAPACITY AND FITNESS FOR SERVICE FROM A BATTERY DYNAMIC PARAMETER AND A RECOVERY VOLTAGE DIFFERENTIAL, U.S. Ser. No. 60/587,232, filed Dec. 14, 2004, entitled CELLTRON ULTRA, U.S. Ser. No. 11/018,785, filed Dec. 21, 2004, entitled WIRELESS BATTERY MONITOR; U.S. Ser. No. 60/653,537, filed Feb. 16, 2005, entitled CUSTOMER MANAGED WARRANTY CODE; U.S. Ser. No. 11/063,247, filed Feb. 22, 2005, entitled ELECTRONIC BATTERY TESTER OR CHARGER WITH DATABUS CONNECTION; U.S. Ser. No. 60/665,070, filed Mar. 24, 2005, entitled OHMMETER PROTECTION CIRCUIT; U.S. Ser. No. 11/141,234, filed May 31, 2005, entitled BATTERY TESTER CAPABLE OF IDENTIFYING FAULTY BATTERY POST ADAPTERS; U.S. Ser. No. 11/143,828, filed Jun. 2, 2005, entitled BATTERY TEST MODULE; U.S. Ser. No. 11/146,608, filed Jun. 7, 2005, entitled SCAN TOOL FOR ELECTRONIC BATTERY TESTER; U.S. Ser. No. 60/694,199, filed Jun. 27, 2005, entitled GEL BATTERY CONDUCTANCE COMPENSATION; U.S. Ser. No. 11/178,550, filed Jul. 11, 2005, entitled WIRELESS BATTERY TESTER/CHARGER; U.S. Ser. No. 60/705,389, filed Aug. 4, 2005, entitled PORTABLE TOOL THEFT PREVENTION SYSTEM, U.S. Ser. No. 11/207,419, filed Aug. 19, 2005, entitled SYSTEM FOR AUTOMATICALLY GATHERING BATTERY INFORMATION FOR USE DURING BATTERY TESTER/CHARGING, U.S. Ser. No. 60/712,322, filed Aug. 29, 2005, entitled AUTOMOTIVE VEHICLE ELECTRICAL SYSTEM DIAGNOSTIC DEVICE, U.S. Ser. No. 60/713,169, filed Aug. 31, 2005, entitled LOAD TESTER SIMULATION WITH DISCHARGE COMPENSATION, U.S. Ser. No. 60/731,881, filed Oct. 31, 2005, entitled PLUG-IN FEATURES FOR BATTERY TESTERS; U.S. Ser. No. 60/731,887, filed Oct. 31, 2005, entitled AUTOMOTIVE VEHICLE ELECTRICAL SYSTEM DIAGNOSTIC DEVICE; U.S. Ser. No. 11/304,004, filed Dec. 14, 2005, entitled BATTERY TESTER THAT CALCULATES ITS OWN REFERENCE VALUES; U.S. Ser. No. 60/751,853, filed Dec. 20, 2005, entitled BATTERY MONITORING SYSTEM; U.S. Ser. No. 11/304,004, filed Dec. 14, 2005, entitled BATTERY TESTER WITH CALCULATES ITS OWN REFERENCE VALUES; U.S. Ser. No. 60/751,853, filed Dec. 20, 2005, entitled BATTERY MONITORING SYSTEM; U.S. Ser. No. 11/352,945, filed Feb. 13, 2006, entitled BATTERY TESTERS WITH SECONDARY FUNCTIONALITY; U.S. Ser. No. 11/356,299, filed Feb. 16, 2006, entitled CENTRALLY MONITORED SALES OF STORAGE BATTERIES; U.S. Ser. No. 11/356,436, field Feb. 16, 2006, entitled ELECTRONIC BATTERY TESTER WITH RELATIVE TEST OUTPUT; U.S. Ser. No. 11/356,443, filed Feb. 16, 2006, entitled ELECTRONIC BATTERY TESTER WITH NETWORK COMMUNICATION; U.S. Ser. No. 11/410,263, filed Apr. 24, 2006, entitled QUERY BASED ELECTRONIC BATTERY TESTER; U.S. Ser. No. 11/498,703, filed Aug. 3, 2006, entitled THEFT PREVENTION DEVICE FOR AUTOMOTIVE VEHICLE SERVICE CENTERS; U.S. Ser. No. 11/507,157, filed Aug. 21, 2006, entitled APPARATUS AND METHOD FOR SIMULATING A BATTERY TESTER WITH A FIXED RESISTANCE LOAD; U.S. Ser. No. 11/511,872, filed Aug. 29, 2006, entitled AUTOMOTIVE VEHICLE ELECTRICAL SYSTEM DIAGNOSTIC DEVICE; U.S. Ser. No. 11/519,481, filed Sep. 12, 2006, entitled BROAD-BAND LOW-CONDUCTANCE CABLES FOR MAKING KELVIN CONNECTIONS TO ELECTROCHEMICAL CELLS AND BATTERIES; U.S. Ser. No. 60/847,064, filed Sep. 25, 2006, entitled STATIONARY BATTERY MONITORING ALGORITHMS; which are incorporated herein in their entirety.

Although battery maintenance techniques have improved, it is still desirable to encourage the use of battery maintenance equipment with such storage batteries.

SUMMARY OF THE INVENTION

Battery maintenance equipment for use with storage batteries includes battery maintenance circuitry. A redemption code output is configured to provide an output having a redeemable value in response to the battery maintenance circuitry. A method is also provided.

DETAILED DESCRIPTION OF ILLUSTRATIVE EMBODIMENTS

The present invention provides a new and useful apparatus and technique for promoting the use of battery maintenance equipment. For example, in many commercial settings such as service stations, automotive dealerships, etc, it is desirable to encourage the service personnel to utilize battery maintenance equipment such as battery chargers, battery testers, etc. Techniques for monitoring usage of battery maintenance equipment are described in U.S. Pat. No. 6,445,158 entitled VEHICLE ELECTRICAL SYSTEM TESTER WITH ENCODED OUTPUT issued Sep. 3, 2002, invented by Kevin I. Bertness and Michael E. Troy; U.S. Pat. No. 6,914,413 entitled ALTERNATOR TESTER WITH ENCODED OUTPUT issued Jul. 5, 2005, invented by Kevin I. Bertness and Michael E. Troy; U.S. Pat. No. 7,003,410 entitled ELECTRONIC BATTERY TESTER WITH RELATIVE TEST OUTPUT issued Feb. 21, 2006, invented by Kevin I. Bertness and David Vonderhaar; U.S. Pat. No. 6,885,195 entitled METHOD AND APPARATUS FOR AUDITING A BATTERY TEST issued Apr. 26, 2005, invented by Kevin I. Bertness; U.S. Pat. No. 6,351,102 entitled AUTOMOTIVE BATTERY CHARGING SYSTEM TESTER issued Feb. 26, 2002, invented by Michael E. Troy; U.S. Pat. No. 6,091,245 entitled METHOD AND APPARATUS FOR AUDITING A BATTERY TEST issued Jul. 18, 2000, invented by Kevin I. Bertness; U.S. Pat. No. 6,051,976 entitled METHOD AND APPARATUS FOR AUDITING A BATTERY TEST issued Apr. 18, 2000, invented by Kevin I. Bertness; pending U.S. Ser. No. 10/791,141 entitled METHOD AND APPARATUS FOR AUDITING A BATTERY TEST filed Mar. 2, 2004, invented by Kevin I. Bertness; pending U.S. Ser. No. 11/356,436 entitled ELECTRONIC BATTERY TESTER WITH RELATIVE TEST OUTPUT filed Feb. 16, 2006, invented by Kevin I. Bertness and David J. Vonderhaar which are incorporated herein in their entirety.

For example, a battery manufacturer which uses dealers using electronic battery testers and encourage the dealers to use the testers in order to service batteries under warranty. The techniques described in the above patents can be used to audit or monitor such measurements and activities in returning batteries under warranty.

The present invention provides an apparatus and technique to encourage service personnel to utilize battery maintenance equipment by rewarding the personnel for such usage. Further, safeguards can be employed to make falsification of the usage more difficult.

Figure 1:
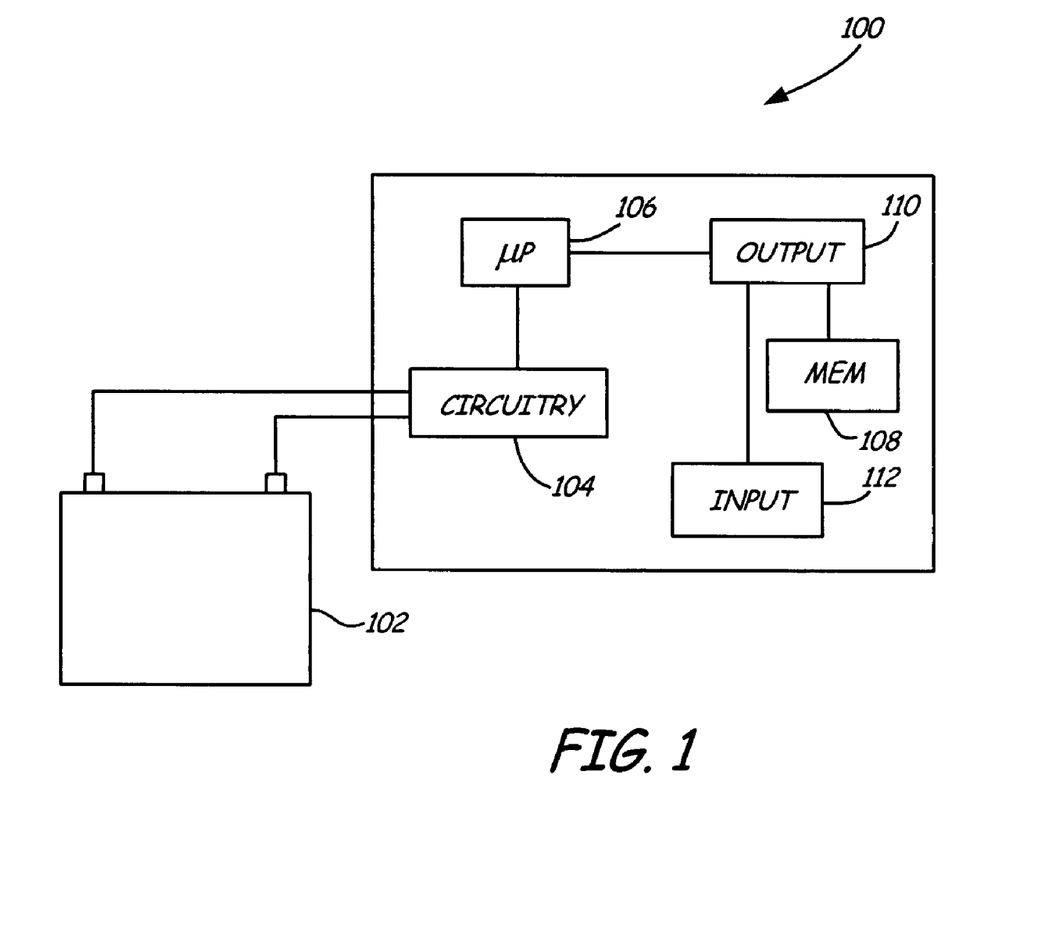
FIG. 1 is a simplified block diagram showing battery maintenance equipment in accordance with the present invention.

FIG. 1 is a simplified diagram of battery maintenance equipment 100 coupled to a storage battery 102. Battery maintenance equipment 100 includes electronic circuitry 104 for coupling to battery 102. Circuitry 104 can be used, for example, charging battery 102, monitoring circuitry 102, testing battery 102, or other battery maintenance circuitry including hydrometers users, load testers, bar code readers used to extract battery parameters, visual inspection check lists, etc. Microprocessor 106 couples to circuitry 104 and operates in accordance with programming instructions stored in memory 108. Memory 108 can also be used to store information during operation of microprocessor 106. An output 110 is provided for providing an output discussed below in more detail. A user input 112 couples to microprocessor 106. Output 110 and input 112 can be in accordance with any type of input and output technique.

Figure 2:
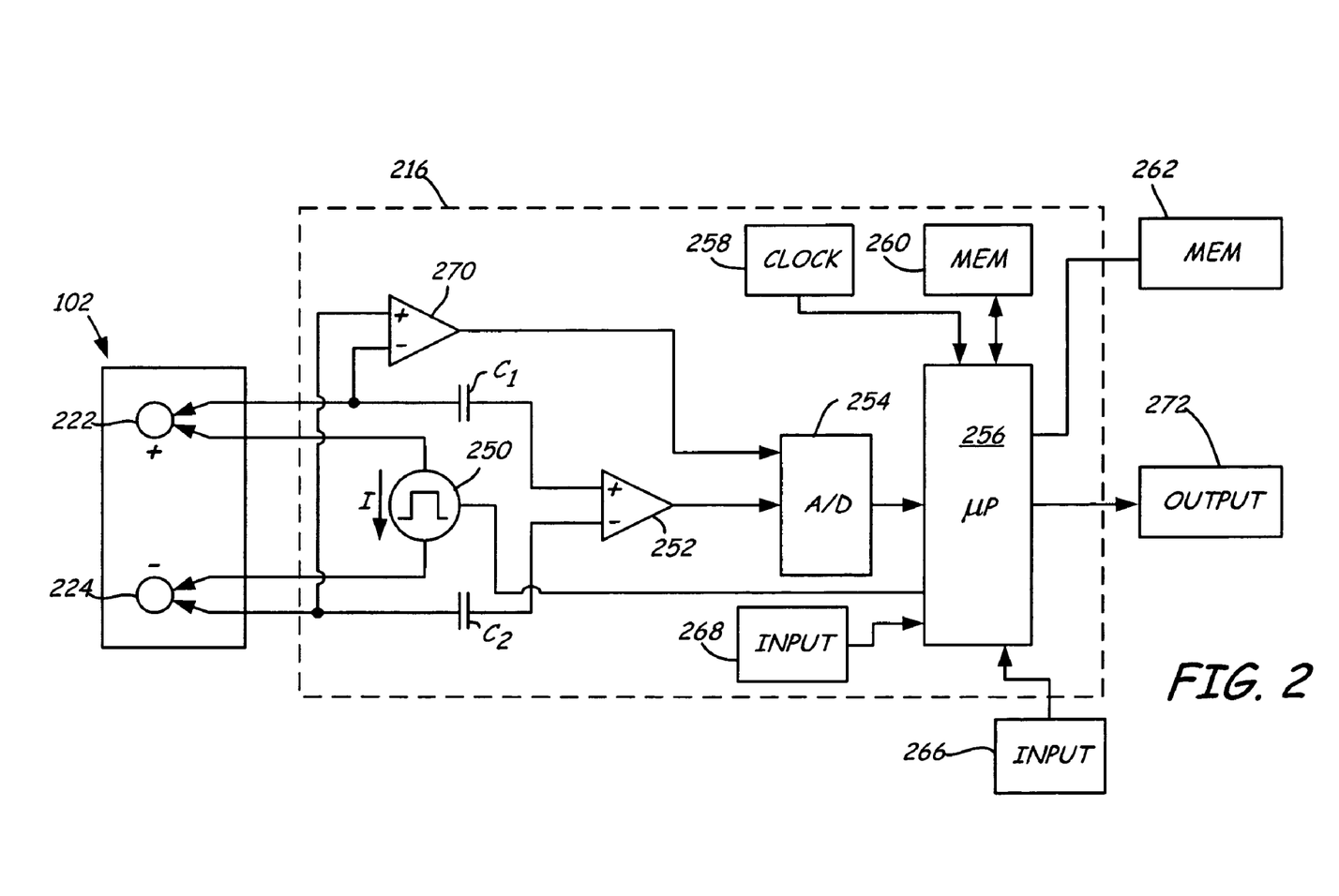
FIG. 2 is a simplified block diagram of battery maintenance equipment comprising a battery tester.

FIG. 2 is a simplified block diagram of battery monitoring circuitry 216 in accordance with the present invention. Apparatus 216 is shown coupled to battery 102 which includes a positive battery terminal 222 and a negative battery terminal 224.

Circuitry 216 operates in accordance with one embodiment of the present invention and determines the conductance ($G_{BAT}$) of battery 102 and the voltage potential ($V_{BAT}$) between terminals 222 and 224 of battery 102. Circuitry 216 includes current source 250, differential amplifier 252, analog-to-digital converter 254 and microprocessor 256. Amplifier 252 is capacitively coupled to battery 102 through capacitors $C_1$ and $C_2$. Amplifier 252 has an output connected to an input of analog-to-digital converter 254. Microprocessor 256 is connected to system clock 258, memory 260, memory 262 and analog-to-digital converter 254. Microprocessor 256 is also capable of receiving an input from input devices 266 and 268. Microprocessor 256 also connects to output device 272.

In operation, current source 250 is controlled by microprocessor 256 and provides a current I in the direction shown by the arrow in FIG. 2. In one embodiment, this is a square wave or a pulse. Differential amplifier 252 is connected to terminals 222 and 224 of battery 102 through capacitors $C_1$ and $C_2$, respectively, and provides an output related to the voltage potential difference between terminals 222 and 224. In a preferred embodiment, amplifier 252 has a high input impedance. Circuitry 216 includes differential amplifier 270 having inverting and noninverting inputs connected to terminals 224 and 222, respectively. Amplifier 270 is connected to measure the open circuit potential voltage ($V_{BAT}$) of battery 102 between terminals 222 and 224. The output of amplifier 270 is provided to analog-to-digital converter 254 such that the voltage across terminals 222 and 224 can be measured by microprocessor 256.

Circuitry 216 is connected to battery 102 through a four-point connection technique known as a Kelvin connection. This Kelvin connection allows current I to be injected into battery 102 through a first pair of terminals while the voltage V across the terminals 222 and 224 is measured by a second pair of connections. Because very little current flows through amplifier 252, the voltage drop across the inputs to amplifier 252 is substantially identical to the voltage drop across terminals 222 and 224 of battery 102. The output of differential amplifier 252 is converted to a digital format and is provided to microprocessor 256. Microprocessor 256 operates at a frequency determined by system clock 258 and in accordance with programming instructions stored in memory 260.

Microprocessor 256 determines the conductance of battery 102 by applying a current pulse I using current source 250. The microprocessor determines the change in battery voltage due to the current pulse I using amplifier 252 and analog-to-digital converter 254. The value of current I generated by current source 250 is known and is stored in memory 260. In one embodiment, current I is obtained by applying a load to battery 102. Microprocessor 256 calculates the conductance of battery 102 using the following equation:

$$\text{Conductance} = G_{BAT} = \frac{\Delta I}{\Delta V} \qquad \text{Equation 1}$$

where I is the change in current flowing through battery 102 due to current source 250 and V is the change in battery voltage due to applied current I.

Based upon the battery conductance $G_{BAT}$ and the battery voltage, the battery tester 216 determines the condition of battery 102. For example, if the battery conductance $G_{BAT}$ is lower than a predetermined threshold for a particular battery at a particular voltage, microprocessor 256 determines that battery 102 has failed the battery test. For example, as explained in the Champlin patents, the tester can compare the measured CCA (Cold Cranking Amps) with the rated CCA for that particular battery. Microprocessor 256 uses information input from input device 266 provided by, for example, an operator. This information may consist of the particular type of battery, location, time, the name of the operator. Additional information relating to the conditions of the battery test is received by microprocessor 256 from input device 268. Input device 268 may comprise one or more sensors, for example, or other elements which provide information such as ambient or battery temperature, time, date, humidity, barometric pressure, noise amplitude or characteristics of noise in the battery or in the test result, or any other information or data which may be sensed or otherwise recovered which relates to the conditions of the test how the battery test was performed, or intermediate results obtained in conducting the test. Additional test condition information is provided by microprocessor 256. Such additional test condition information may include the values of $G_{BAT}$ and battery voltage, the various inputs provided to battery tester 216 by the operator which may include, for example, type of battery, estimated ambient or battery temperature, type of vehicle (i.e., such as provided through the Vehicle Identification Number (VIN) code for the vehicle) or the particular sequence of steps taken by the operator in conducting the test. In accordance with the present invention, microprocessor 256 uses some, or all, of the various battery test condition information and combines such test condition information with the test result to generate a redemption code. This redemption code is provided to output device 272 which may comprise, for example, a display or a printer. In another embodiment, the redemption code is stored in memory 262 for subsequent use. As used herein, input circuitry refers to any circuitry used to obtain the test condition information and may include inputs 266 and 268, memory 260, etc.

Figure 3:
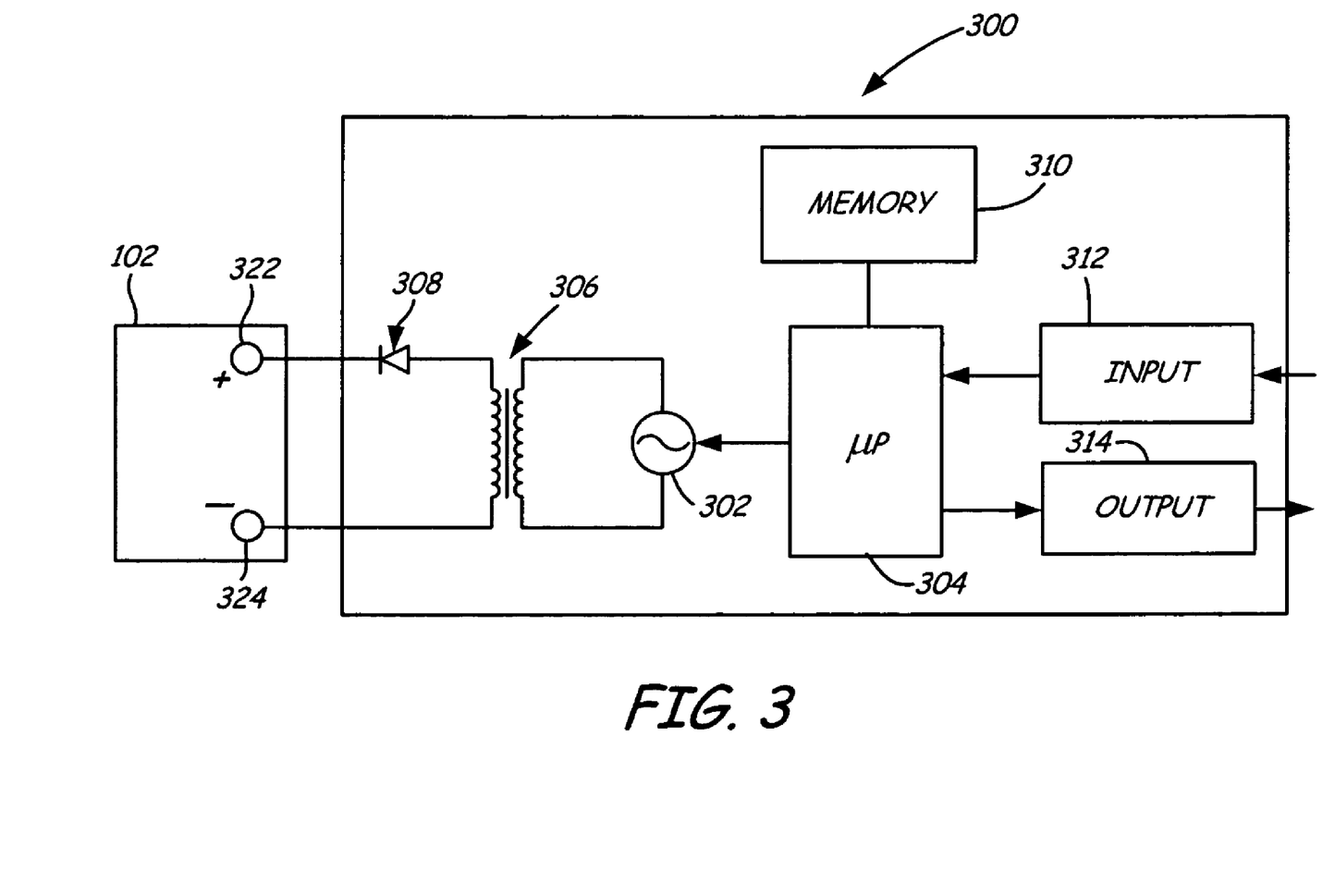
FIG. 3 is a simplified block diagram of battery maintenance equipment comprising a battery charger.

FIG. 3 is a simplified block diagram of a battery charger 300 showing another example of battery maintenance equipment. Charger 300 is configured to couple to battery 102 through connections 322 and 324. A power source 302 can optionally controlled by microprocessor 304. Power source 302 is illustrated as being coupled to battery 102 through a transformer 306 and a rectifying dial 308. Microprocessor 304 operates in accordance with instructions stared in memory 310 and can receive other types of input through 312 and provide an output through output 314. During operation, the battery 102 is charged with power from power source 302. The microprocessor 304 provides a redemption code in accordance with the invention.

Figure 4:
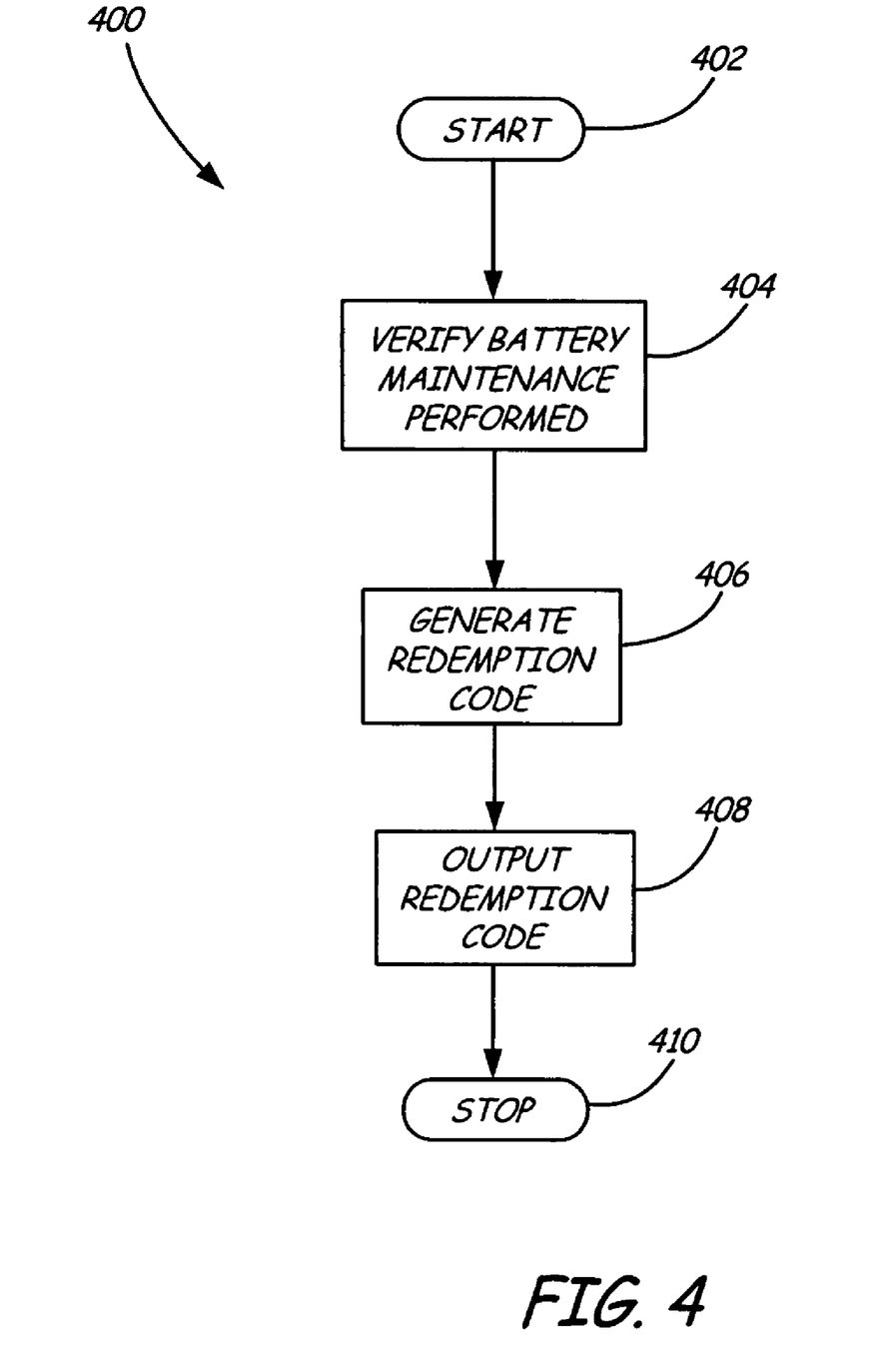
FIG. 4 is a simplified flow chart showing steps in generating a redemption code in accordance with the present invention.

FIG. 4 is a simplified block diagram 400 showing steps in accordance with the present invention. At block 402, the procedures start and at block 404 the procedure verifies that battery maintenance has been performed. In response to the battery maintenance, at block 406 a redemption code is generated. At block 408, the redemption code is provided as an output and the procedure stops at block 410.

As discussed above, it is often desirable to encourage the use of battery maintenance equipment. For example, encouraging the use of battery testing equipment can assist in identifying bad batteries and thereby increase battery sales. Similarly, the use of battery test equipment can reduce warranty claims. Use of battery charging equipment can also be desirable to help maintain the charge on a customer's battery, batteries in storage, etc. In accordance with present invention, the battery maintenance device provides a battery redemption code which has some value to an operator. The redemption code is based upon usage of the battery maintenance equipment and thereby encourages the operator to use the operator equipment.

In one example, the redemption code is output on a coupon, paper receipt, or other physical output. This can be collected by the operator for subsequent redemption. In another example, the output is non-physical in nature, for example, data transmitted over a network, either wireless or wired, such that the redemption can be performed electronically.

The output can be provided based upon any desired criteria. For example, the output can be provided based upon a certain number of tests or usage (X) performed by the maintenance equipment, a certain number of days (Y), etc. X or Y can be random numbers or fixed numbers. X, the amount the maintenance equipment is used, can be configured to exclude duplicate usage, such as duplicate tests, in order to reduce the likelihood that usage of the maintenance equipment is falsified. Duplicate tests can be determined by noting relatively small difference in test results or usage, short time duration, or other techniques.

The output can be redeemable for any type of goods or service, or for other items having value to an operator. For example, the output can be redeemable for merchandise, exchanged for money, discounts, event tickets, vacation days, recognition for outstanding personnel, etc. The output can be a simple number carried on a printout and manually entered into a database or can be transmitted electronically, faxed, mailed, etc. to a central location. The number can be formed in an encrypted format or otherwise "hashed" so that it is difficult to falsify. This output can contain information such as statistics on the usage of the maintenance equipment, the serial number of the maintenance equipment, the zip code of the location of the maintenance equipment, the number of "good" batteries or "bad" batteries tested, the date of usage, the name or other information, identifying the operator, etc. This additional information can be retrieved from the memory in the device or can be retrieved over the input illustrated in Figures discussed above.

In another example, the output is provided in response to every use of the maintenance equipment. The outputs can be placed in some type of "pool" and a lottery held periodically to determine a winning number. The lottery system can be altered to increase the odds of winning for special promotions.

Figure 5:
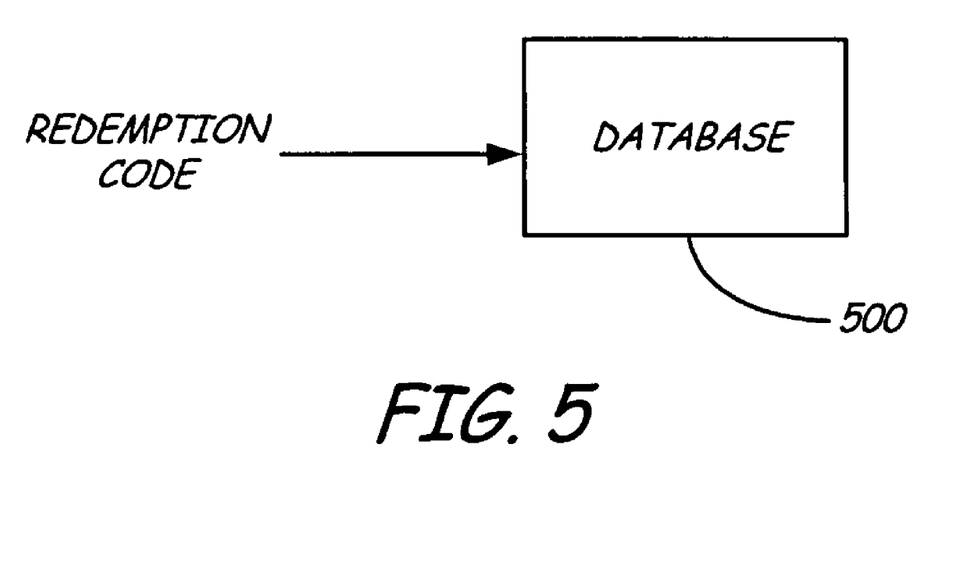
FIG. 5 shows a database used to collect redemption codes.

The redemption code can be provided to a database, for example, database 500 illustrated in FIG. 5. The database can be located in any appropriate location including at the site where the maintenance equipment is used, or at a remote location such as at a manufacturers site, central office, etc. The database 500 can be coupled to the maintenance equipment using, for example, a network connection such as a through the internet, private network, a telephone link, etc.

In another configuration, the redemption code is displayed on the maintenance equipment and/or printed out and entered directly into the database 500 by the operator. The redemption code can, for example, comprise a bar code which is scanned into the database or, as mentioned above, be transmitted wirelessly to the database using techniques such as radio frequency (RF) transmission, infrared transmissions, etc. Such wireless methods can be desirable because they can be used to provide instant notification of "winning". For example, the communications with the maintenance equipment can be bidirectional communications such that an output is provided directly on the equipment indicating to the operator that they have "won". The redemption codes can be retained with the maintenance equipment for subsequent auditing or can be retained and printed or otherwise output in a batch mode. For example, the batch may contain a series of bar codes, numbers, network outputs, etc.

Although the present invention has been described with reference to preferred embodiments, workers skilled in the art will recognize that changes may be made in form and detail without departing from the spirit and scope of the invention. The present invention is not limited to the particular battery tester or battery charger configuration illustrated above. Further, the invention can be used with any type of battery maintenance equipment and is not limited to those discussed herein.

What is claimed is:

1. Battery maintenance equipment for use with storage batteries of the type used in an automotive vehicle, comprising:
    battery maintenance circuitry configured to couple to a storage battery in the automotive vehicle through Kelvin connections to terminals of the storage battery and responsively measure a parameter of the storage battery based up a current flowing through the terminals of the storage battery and a voltage measured across the terminals of the storage battery;
    an input configured to receive maintenance condition information related to a maintenance condition under which maintenance is performed on the battery and verifying use of the battery maintenance equipment with the storage battery;
    redemption code circuitry configured to provide a redemption code output having a redeemable value in response to a battery test performed by the battery maintenance circuitry and which includes maintenance condition information received by the input wherein the redeemable value is selected to promote use of the battery maintenance circuitry,
    wherein the redemption code output is a function of a number of times the maintenance equipment has been used with the battery.

2. The apparatus of claim 1 wherein the redemption code output comprises a printed output.

3. The apparatus of claim 2 wherein the printed output comprises a coupon.

4. The apparatus of claim 1 wherein the redemption code output is a function of time.

5. The apparatus of claim 1 wherein the redemption code output is transmitted over a network.

6. The apparatus of claim 1 wherein the redemption code output is a wireless output.

7. The apparatus of claim 1 wherein the redemption code output is based upon the number of times the battery maintenance circuitry is utilized.

8. The apparatus of claim 1 wherein the redemption code output is based upon a period of time.

9. The apparatus of claim 1 wherein the redemption code output includes information related to a serial number of the maintenance equipment.

10. The apparatus of claim 1 wherein the redemption code output includes information related to a location of the maintenance equipment.

11. The apparatus of claim 1 wherein the redemption code output includes information related to the date.

12. The apparatus of claim 1 wherein the redemption code output identifies an operator.

13. The apparatus of claim 1 wherein the redemption code output is for use in a lottery.

14. The apparatus of claim 1 wherein the redemption code output is displayed on the battery maintenance equipment.

15. The apparatus of claim 1 wherein the redemption code output comprises a bar code.

16. The apparatus of claim 1 including a memory configured to store a plurality of redemption code outputs.

17. A method of encouraging use of battery maintenance equipment with storage batteries of automotive vehicles, comprising:
    coupling battery maintenance circuitry to a storage battery of an automotive vehicle through Kelvin connections to terminals of the storage battery and measuring a parameter of the storage battery based up a voltage measured across the terminals of the storage battery in response to a current flowing through the terminals of the storage battery;
    verifying use of the battery maintenance equipment with a storage battery;
    generating a redemption code in response to verifying that a battery test has been performed on the storage battery by the battery maintenance equipment the redemption code having a value selected to promote use of the battery maintenance equipment with the storage battery, wherein the redemption code is based upon the number of times the battery maintenance circuitry is utilized; and
    outputting the redemption code.

18. The method of claim 17 wherein outputting comprises printing the redemption code output.

19. The method of claim 18 wherein the printed output comprises a coupon.

20. The method of claim 17 wherein the outputting is a function of a number of times the maintenance equipment has been used with the storage battery.

21. The method of claim 17 wherein the outputting is a function of time.

22. The method of claim 17 wherein the outputting comprises transmitting over a network.

23. The method of claim 17 wherein the outputting is provided wirelessly.

24. The method of claim 17 wherein the redemption code is based upon a period of time.

25. The method of claim 17 wherein the redemption code includes information related to serial number of the maintenance equipment.

26. The method of claim 17 wherein the redemption code includes information related to the location of the test equipment.

27. The method of claim 17 wherein the redemption code includes information related to the date.

28. The method of claim 17 wherein the redemption code identifies an operator.

29. The method of claim 17 wherein the redemption code is for use in a lottery.

30. The method of claim 17 wherein the redemption code is displayed on the battery maintenance equipment.

31. The method of claim 17 wherein the redemption code output comprises a bar code.

32. The method of claim 17 including storing a plurality of redemption codes in a memory.

33. The method of claim 17 including storing the redemption code in a centralized database.

* * * * *

UNITED STATES PATENT AND TRADEMARK OFFICE
CERTIFICATE OF CORRECTION

| | | |
|---|---|---|
| PATENT NO. | : 7,791,348 B2 | |
| APPLICATION NO. | : 11/711356 | |
| DATED | : September 7, 2010 | |
| INVENTOR(S) | : Brown et al. | |

It is certified that error appears in the above-identified patent and that said Letters Patent is hereby corrected as shown below:

On the Title page:
        Item (73) Assignee: add, INTERSTATE BATTERY SYSTEM OF AMERICA, INC., Signed and Sealed this
Twenty-sixth Day of July, 2011

David J. Kappos
*Director of the United States Patent and Trademark Office*